US010781025B2

(12) United States Patent
Toubeau et al.

(10) Patent No.: US 10,781,025 B2
(45) Date of Patent: Sep. 22, 2020

(54) FIBROUS SUBSTRATE CONTAINING FIBERS AND NANOFIBRILLAR POLYSACCHARIDE

(71) Applicant: AHLSTROM-MUNKSJÖ OYJ, Helsinki (FI)

(72) Inventors: Francois Toubeau, Oullins (FR); Gilles Vetter, Estrablin (FR)

(73) Assignee: AHLSTROM-MUNKSJÖ OYJ, Helsinki (FI)

( * ) Notice: Subject to any disclaimer, the term of this patent is extended or adjusted under 35 U.S.C. 154(b) by 120 days.

(21) Appl. No.: 14/773,778

(22) PCT Filed: Mar. 19, 2014

(86) PCT No.: PCT/FI2014/050203
§ 371 (c)(1),
(2) Date: Sep. 9, 2015

(87) PCT Pub. No.: WO2014/147295
PCT Pub. Date: Sep. 25, 2014

(65) Prior Publication Data
US 2016/0016717 A1 Jan. 21, 2016

(30) Foreign Application Priority Data
Mar. 20, 2013 (FR) ..................... 13 52507

(51) Int. Cl.
| | |
|---|---|
| B65D 81/24 | (2006.01) |
| D21H 17/25 | (2006.01) |
| D21H 17/24 | (2006.01) |
| D21H 27/08 | (2006.01) |
| D21H 11/18 | (2006.01) |
| D21H 21/10 | (2006.01) |
| D21H 15/02 | (2006.01) |
| D21H 17/28 | (2006.01) |
| D21H 21/52 | (2006.01) |
| B01D 39/16 | (2006.01) |
| B01D 39/20 | (2006.01) |
| B65D 65/42 | (2006.01) |
| D21H 11/00 | (2006.01) |
| D21H 27/30 | (2006.01) |

(52) U.S. Cl.
CPC ......... B65D 81/24 (2013.01); B01D 39/1607 (2013.01); B01D 39/1615 (2013.01); B01D 39/2017 (2013.01); B65D 65/42 (2013.01); D21H 11/00 (2013.01); D21H 11/18 (2013.01); D21H 15/02 (2013.01); D21H 17/24 (2013.01); D21H 17/25 (2013.01); D21H 17/28 (2013.01); D21H 21/10 (2013.01); D21H 21/52 (2013.01); D21H 27/08 (2013.01); D21H 27/30 (2013.01); B01D 2239/025 (2013.01); B01D 2239/064 (2013.01)

(58) Field of Classification Search
CPC .............................. B65D 65/42; B65D 81/24
USPC ................................... 442/327, 377
See application file for complete search history.

(56) References Cited

U.S. PATENT DOCUMENTS

| | | | | |
|---|---|---|---|---|
| 1,633,787 | A * | 6/1927 | Kress | D21H 27/32 |
| | | | | 156/224 |
| 3,904,876 | A | 9/1975 | Arendt | |
| 5,203,491 | A * | 4/1993 | Marx | A21B 3/131 |
| | | | | 220/573.1 |
| 5,387,319 | A * | 2/1995 | Mora | D21H 11/18 |
| | | | | 162/146 |
| 8,513,147 | B2 | 8/2013 | Gupta et al. | |
| 2002/0136913 | A1 | 9/2002 | Schaedler et al. | |
| 2003/0000665 | A1 | 1/2003 | Takai et al. | |
| 2003/0177909 | A1 | 9/2003 | Koslow | |
| 2006/0265042 | A1 | 11/2006 | Catanese et al. | |
| 2010/0024998 | A1 | 2/2010 | Wildlock et al. | |
| 2010/0272938 | A1 | 10/2010 | Mitchell et al. | |
| 2011/0008638 | A1 | 1/2011 | Miyawaki et al. | |
| 2011/0223401 | A1 | 9/2011 | Harlin et al. | |
| 2012/0043039 | A1 | 2/2012 | Paltakari et al. | |
| 2012/0080156 | A1 | 4/2012 | Laleg et al. | |
| 2012/0094047 | A1 | 4/2012 | Albertsson et al. | |
| 2012/0129775 | A1 | 5/2012 | Zudaire et al. | |
| 2012/0132380 | A1 | 5/2012 | Hentze et al. | |
| 2012/0132381 | A1 | 5/2012 | Hentze et al. | |
| 2012/0132383 | A1 | 5/2012 | Laine et al. | |
| 2012/0251818 | A1 | 10/2012 | Axrup et al. | |
| 2013/0000855 | A1 | 1/2013 | Nuopponen et al. | |

(Continued)

FOREIGN PATENT DOCUMENTS

| | | |
|---|---|---|
| JP | H11206611 A | 8/1999 |
| JP | 2013104142 A | 5/2013 |

(Continued)

OTHER PUBLICATIONS

PCT International Search and Preliminary Examination Guidelines available at http://www.wipo.int/export/sites/www/pct/en/texts/pdf/ispe.pdf (3 pages).*
Dictionary.com definition of "barrier" retrieved Feb. 27, 2018.*
International Search Report(ISR) and Written Opinion(WO) for parent PCT application PCT/FI2014/050203 dated Jul. 2, 2014.
International Preliminary Report on Patentability (IPRP) for parent PCT application PCT/FI2014/050203 dated Oct. 1, 2015.
ASTM, Paper and Paperboard Characteristics, Nomenclature, and Significance of Tests, American Society for Testing and Materials, 1963.

(Continued)

Primary Examiner — Peter Y Choi
(74) Attorney, Agent, or Firm — Nixon & Vanderhye P.C.

(57) ABSTRACT

A single-layer fibrous substrate comprising, by dry weight compared with the weight of the substrate:
between 39.9 and 87.9% natural fibers refined to above 50° SR;
between 12 and 60% nanofibrillar polysaccharide; and
between 0.1 and 4% of at least one retention agent.

19 Claims, No Drawings

(56) References Cited

U.S. PATENT DOCUMENTS

| | | |
|---|---|---|
| 2013/0017349 A1 | 1/2013 | Heiskanen et al. |
| 2013/0180680 A1 | 7/2013 | Axrup et al. |
| 2013/0202870 A1 | 8/2013 | Malmnborg et al. |
| 2013/0292075 A1 | 11/2013 | Laine et al. |

FOREIGN PATENT DOCUMENTS

| | | |
|---|---|---|
| SU | 694572 A1 | 10/1979 |
| WO | 2007088974 A1 | 8/2007 |
| WO | 2010092239 A1 | 8/2010 |
| WO | 2010125247 A2 | 11/2010 |
| WO | 2010142845 A1 | 12/2010 |
| WO | 2011064441 A1 | 6/2011 |
| WO | 2012040830 A1 | 4/2012 |

OTHER PUBLICATIONS

Casey, Pulp and Paper Chemistry and Chemical Technology, Third Edition, vol. 3, John Wiley & Sons, Inc., 1981.

Menard, et al., Increasing ash without compromise—A comprehensiveapproach, PaperCon 2022, pp. 583-590.

Lwako, et al., A Review on Pulp Manufacture from Non Wood Plant Materials, International Journal of Chemical Engineering and Applications, vol. 4, No. 3, Jun. 2013.

TAPPI Test Method T211 entitled, "Ash in wood, pulp, paper and paperboard: combustion at 525° C.".

Smook, G.A., Handbook of Pulp and Paper Technology, 1990, p. 210.

http://www.paperonweb.com/dict.htm definition of "ash content" and "filler," 2 pages, accessed Feb. 14, 2017.

Tappi, "Effects of Calendaring, supercalendaring," Paper Sizing, 1989, p. 98.

Lange, et al. "Novel method for testing the grease resistance of pet food packaging," Packaging Technology and Science, 2002, vol. 15, pp. 65-74.

Lutz Hamann, "Wet-end applications of NFC", SUNPAP workshop, (Oct. 5, 2011), ISSN 1, p. 24, XP055372840.

TAPPI Test Method T413, entitled, "Ash in wood, pulp, paper and paperboard: combustion at 900° C.".

EFT Kurary Kuralon webpages: URL: http://www.eftfibers.com/prod_k-PVA.php, 2010, accessed Jan. 16, 2018, 2 pages.

Syverud and Stenius. "Strength and barrier properties of MFC films," Celluose_2009_pp. 75-85.

\* cited by examiner

FIBROUS SUBSTRATE CONTAINING FIBERS AND NANOFIBRILLAR POLYSACCHARIDE

CROSS-REFERENCE TO RELATED APPLICATIONS

This application is a U.S. national phase application of International Application No. PCT/FI2014/050203 filed on 19 Mar. 2014, which designated the U.S., and which claims priority to French Patent Application No. 1352507 filed on 20 Mar. 2013. The contents of each of these applications are hereby incorporated by reference in their entirety in this application.

BACKGROUND OF THE INVENTION

Field of the Invention

The present invention relates to a substrate containing refined natural fibers and nanofibrillar polysaccharide, the substrate having barrier properties.

The field of use for the present invention relates in particular to agrifood-processing packaging, such as for example in packages for agrifood, or pet agrifood bags.

This fibrous substrate may be used to package fatty substances such as butter, for example. It can also be used in the field of specialty papers that require a certain barrier level to solvents or other organic compounds. As an example of such organic compounds, that are coated with silicone to get release properties needed as for example in release papers for self-adhesive labels may be mentioned. It may also be envisaged in filtration applications as a membrane or membrane substrate for filtration.

Prior Art

Agrifood storage, transport, handling and lifecycle of packaging containing in particular fatty agrifoods such as butter or pet agrifood generally require packaging, which have barrier properties against fatty substances in particular because of the nature of the agrifoods, and adequate mechanical properties including tear resistance. Generally, these papers are treated specifically to prevent any grease impregnation and diffusion within the packaging. Fatty substances can not only cause stains to appear on the outside of the packaging but they can also alter the paper's mechanical strength.

To solve these problems, various solutions have been considered.

The first solution consists of treating the surfaces of papers, porous fibrous substrates or the fibrous bulk with fluorine so as to obtain a surface energy lower than the surface tension of the grease. Consequently, the grease cannot "wet" these fluorinated fibrous substrates. Further, the quantity of fluorine may be adjusted according to the final application considered.

For example, within the scope of pet agrifood bags, the quantity of fluorine may vary from 0.420 to 3.5 kg per ton of cellulose fibers constituting the fibrous substrate.

A second solution consists in using greaseproof paper obtained by parchmentizing of cellulose fibers. However, this type of substrate has low tear resistance, which makes it unsuitable for making bags. Indeed these kinds of bags often tear when they fall during handling operations.

Other more costly options consist in coating, off-line, polymers on the surfaces of the cellulose substrate that are getting in contact with the fatty substances in order to form a grease-barrier layer. These polymers are from the family of polyethylene (PE), polypropylene (PP), polyethylene terephthalate (PET), ethylene vinyl alcohol (EVOH) and ethylene vinyl acetate (EVA) or similar.

Document US 2002/136913 describes a fibrous product comprising a water vapor barrier, obtained by coating an aqueous dispersion, on a paper machine.

Document WO 2011/056130 states that polymers used in surface treatment reduce the folding resistance necessary to form a packaging. This document describes an alternative method, consisting of replacing between 0.5% and 20% by weight of synthetic polymers or polysaccharides in an aqueous dispersion with microfibrillated cellulose. However, the grease-barrier properties for this type of substrate are limited in time, 32-48 hours.

Document WO 2011/078770 describes a fibrous structure onto which two layers of 0.1 g to 10 g microfibrillated cellulose are coated. This substrate is then coated with a double polyethylene coating for a total weight of 24 g/m$^2$.

Document US 2011/0223401 describes a fibrous product coated with a biopolymer, and having a barrier layer obtained by vacuum metallization.

This type of surface layer generally has a weight of at least 10 grams, or even greater than 14 g/m$^2$. To produce the desired barrier properties, the substrate is devoid of holes and air bubbles. Consequently, this technique may be relatively expensive because its result depends on the quality of the coating and the drying. Further, the obtained properties may be insufficient because this treatment does not block grease migration at the edges of the packaging.

Consequently, the drawbacks related to this technique limit its implementation to very specific markets.

The prior art comprises other options that are particularly tricky to implement at industrial scale.

For example, documents WO 2011/147823 and WO 2011/14825 describe films of 100% nanofibrillated cellulose dried in the open air for 24 hours. Such a step is difficult to implement for producing barrier materials on an industrial scale.

Document WO 2011/005181 describes a preparation process of barrier substrates including film preparation containing various contents of monosaccharides, oligosaccharides and polysaccharides, which requires such preparations being coated on a PET-38μ film, and dried by allowing slow evaporation of water at room temperature.

Other options propose adding microfibrillated cellulose to the bulk.

Regardless, these substrates have grease-barrier properties that are lower than those of fluorinated substrates. Either the thickness of the layer of microfibrils is insufficient, or the morphology of nanofibrils is not suitable given the lack of fiber refining in compositions to which these microfibrils are added.

Documents WO 2010/14825 and WO 2010/142846 describe fibrous substrates whose fiber contents do not exceed 30%. These substrates comprise nanofibrillar cellulose (NFC) added at the wet end, whose content varies from 25% to 100%.

Further, the process described in these two documents is complex given that the substrate, when it is being dried, contains between 50 and 100% organic solvent.

The other problems relating to the substrates in the prior art relate to:
 folding resistance. While these substrates are being used, many folds may be formed that weaken the barrier properties at these folds;
 limitation for barrier applications that require tear resistance.

The Applicant has developed a substrate that solves the problems of the prior art, and in particular gives barrier properties while ensuring folding resistance and tear resistance, and does this without requiring the use of fluorochemicals, a parchmentizing or polymeric treatment.

DESCRIPTION OF THE INVENTION

The present invention relates to a substrate containing cellulose fibers having barrier properties to fatty substances and being water-repellent. In an advantageous manner, this barrier substrate does not comprise fluorinated derivatives. It may in particular be used in manufacturing agrifood processing packaging requiring a grease barrier. It may in particular relate to pet agrifood storage, or storage of fatty substances such as butter.

More specifically, the present invention relates to a single-layer fibrous substrate comprising, by dry weight compared with the dry weight of said substrate:
- between 39.9 and 87.9% of natural fibers refined to above 50° SR, advantageously between 47.5 and 77.5;
- between 12 and 60% nanofibrillar polysaccharide, advantageously between 22.5 and 52%; and
- between 0.1 and 4% of at least one retention agent, advantageously between 0.2 and 0.4%.

The single-layer fibrous substrate identified in the invention advantageously presents a low bulk before calendering, i.e. a thickness/basis weight ratio lower than 1.4, even more advantageously lower than 1.14. The bulk is the ratio between the substrate thickness, expressed in micrometers, and the weight per unit of surface area, i.e. basis weight of the substrate, expressed in grams per square meter.

Without wishing to be bound by any particular theory, the Applicant thinks that the grease-barrier properties result from the density of the substrate. Using highly refined fibers does not deliver the density that gives the expected barrier properties. By contrast, the refining/nanofibril combination makes the substrate denser to deliver a satisfactory thickness/basis weight ratio, i.e. bulk.

In an advantageous manner, the thickness/basis weight ratio of the single-layer substrate identified in the invention corresponds to a measurement made without having previously subjected said substrate to a pressing or supercalendering process.

Although the calendering, or supercalendering operation generally improves the barrier properties, that is not the case for products containing fluorinated treatments. Indeed, the grease barrier level of these substrates degrades after calendering (see Tappi 1989, "Paper Sizing" page 98, "Effects of calendering, supercalendering").

In an advantageous manner, the single-layer fibrous substrate indicated in the invention has a weight (basis weight) of at least 10 g/m². It is advantageously between 20 and 1000, even more advantageously between 20 and 200 g/m².

Natural Fibers:

The term "natural fiber" is herein intended to include fibers from any plant and plant based material.

According to a preferred embodiment, the natural fibers are cellulose fibers, which can advantageously be from softwood (bleached Kraft pulp from resinous—Arauco 90 pine radiata—Southern Bleached Softwood Kraft pulp), unbleached softwood (ASPA UKP-E pine-spruce Unbleached Kraft Pulp). The natural fibers may also be obtained from hardwood, bleached Acacia pulp, or bleached eucalyptus pulp (Fibrilla BEKP Bleached Eucalyptus Kraft pulp).

Generally, the cellulose fibers may be bleached or unbleached fibers. Bleached fibers mean that the suspension of fibers, or pulp, has undergone a bleaching treatment according to techniques known to the person skilled in the art.

Further and as already indicated, the natural fibers are refined above 50° SR. They may advantageously be refined between 50 and 95° SR, more preferably between 68 and 95° SR, and most preferably between 88 and 92° SR.

This refining measurement corresponds to a dewatering index, expressed in Schopper-Riegler degrees (° SR). The more the pulp (suspension of natural fibers) is refined, the more water is retained. A paper whose pulp has been more refined shows a decrease of air permeability, bulk, absorbency and opacity. Refining means the fibers fibrillate and branch.

Before refining, the wood fiber length is advantageously between 0.4 and 3 to 4 mm.

However, the natural fibers for the single-layer fibrous substrate generally have a diameter, or thickness, between 17 and 32 micrometers, even more advantageously between 19.6 and 32 micrometers. Further, the arithmetic average length for these fibers is advantageously greater than 1 micrometer, more preferably between 400 and 3300 micrometers, most advantageously between 1400 and 3300 micrometers.

Nanofibrillar Polysaccharide:

Regarding nanofibrillar polysaccharide, this is nanofibers whose diameter, or thickness, is advantageously between 5 and 100 nanometers. Further, the length of the nanofibrils is less than 1 micrometer. It is advantageously between 400 and 500 nanometers.

In an advantageous manner, the nanofibrillar polysaccharide is nanofibrillar cellulose (NFC) obtained from wood pulp source (TURBAK & AL 1983).

Nanofibrils may in particular be prepared from a dissolving pulp made of softwood, long fibers (softwood cellulose pulp), or from a mixture of pine and spruce.

This dissolving pulp may undergo the following treatment to produce nanofibrils:
- first refining to 25° SR;
- enzymatic treatment at 50° C. in the presence of endoglucanase;
- second refining to 80° SR;
- several passes in a homogenizer.

The quantity of nanofibrils is preferably greater than 37.5%, in particular when the fibrillation level of fibers obtained after treatment gives a Schopper-Riegler value between 50 and 70°.

The quantity of nanofibrils is preferably between 22.5 and 52.5% by weight in particular when the natural fibers are refined to 90° Schopper-Riegler, i.e. when the fibrillation level of fibers obtained after treatment has Schopper-Riegler value equivalent to 90°.

Retention Agent:

As already stated, the single-layer fibrous substrate of the invention comprises natural fibers and nanofibrillar polysaccharide. It further comprises at least one retention agent that, among other, enables the fibers to be retained when the fibrous substrate is formed.

Generally, in paper manufacturing processes, the sheet is formed by depositing a suspension of natural fibers on a forming wire whose porosity allows the resulting sheet to be dewatered. Bearing in mind their size, the nanofibrillar polysaccharide may pass through this forming wire.

Within the scope of the invention, the nanofibrils are retained in particular because of the presence of a retention agent without which more than 85% of the added nanofibrils are not retained in the substrate, regardless the refining level of the fibers to which the NFC is added, including when the nanofibrils are added with the natural fibers before passing through the refiners.

The retention agent may in particular be chosen from the group comprising polyacrylamide polymers, BASF Percol 1830, BASF Percol 3035 or similar giving high retention levels and/or no problems to release the sheet from the forming wire. A good retention level with high nanofibrillar polysaccharide addition content (20% to 50%) means getting a substrate with a weight very similar to the dry weight applied on the forming wire at the wet end and water under the forming wire, whose turbidity is less than 10 FAO units, corresponding to liquid clarity similar to that of deionized water.

The person skilled in the art will be able to effectively select the suitable retention agent depending on the nanofibers and nanofibrils used.

Additives:

To improve its barrier properties and folding resistance, the single-layer fibrous substrate identified in the invention may also comprise at least one additive that may in particular be chosen from the group comprising:
  paper wet strength agents, particularly a polyamide epichlorohydrin resin;
  sizing agents, particularly, an AKD (alkyl ketene dimer) or ASA (alkyl succinic anhydride) resin or a mixture of rosin and AKD and aluminum sulfate;
  mineral salts, particularly aluminum sulfate, bicarbonate or carbonate salts;
  cationic and/or anionic polymers that increase the effect of the wet strength resin and/or to strengthen the dry properties, particularly a Hercobond 2050P anionic polymer or similar, CMC (carboxy methyl cellulose).

Additional Fibrous Layer(s)—Multi-Layer Substrate:

According to a specific embodiment of the invention, the single-layer fibrous substrate of the invention may comprise at least one extra layer so as to form a multi-layer substrate. This multi-layer fibrous substrate comprises the single-layer fibrous substrate described previously and at least one extra layer. This extra layer may contain cellulose fibers (paper, board), or synthetic fibers, preferably containing polylactic acid (PLA).

The extra layer may be a layer to increase mechanical strength.

It may in particular be an additional layer such as the layer constituting the single-layer fibrous substrate described hereinbefore. Therefore it may comprise:
  between 39.9 and 87.9% natural fibers refined to above 50° SR, advantageously between 47.5 and 77.5%;
  between 12 and 60% nanofibrillar polysaccharide, advantageously between 22.5 and 52.5%; and
  between 0.1 and 4% of at least one retention agent, advantageously between 0.2 and 0.4%.

It may also be an additional layer different to the layer constituting the single-layer fibrous substrate described hereinbefore to strengthen the mechanical properties of the barrier substrate including tear resistance.

In particular, to give to the barrier substrate a tear resistance index of 44 mN·m$^2$/g as required in parallel with barrier properties.

In this case, the weight of this additional layer will preferably exceed 79 g/m$^2$ to deliver a tear resistance of 3500 mN to this variant of the single-layer product identified in the invention.

It may also be an additional layer different to the layer constituting the single-layer fibrous substrate described hereinbefore to deliver the reverse effect to the desired one i.e. to absorb liquids.

In the fields of medical and packaging, the single-layer barrier layer identified in the invention may replace polypropylene nonwovens obtained by melt routes, polyethylene films in particular when those are laminated with absorbent cellulosic substrates.

The additional layer or layers may also be devoid of nanofibrils.

The person skilled in the art will therefore know how to adapt the nature of the additional layer or layers depending on the application considered.

The single-layer fibrous substrate of the invention may thus be sandwiched between two additional layers; for example, so as to form a multi-layer fibrous substrate.

These additional layers may comprise refined or unrefined natural fibers, nanofibrillar polysaccharide, retention agents, and/or the previously cited additives. They may also comprise pressure and optionally temperature sensitive additives; natural fibers; synthetic fibers; cellulose fiber having opacity, mechanical, clogging, barrier or absorption properties.

Generally, the fibrous substrate of the invention, and in particular the monolayer substrate, has an ash content of less than 10% by weight, compared with the weight of said fibrous substrate, even more advantageously of less than 5%.

Properties/Characteristics:

Without wishing to be bound by any particular theory, the Applicant considers that the nanofibrillar density in particular gives the fibrous substrate of the invention lipophobic properties.

Accordingly, the substrate identified in the invention having a weight of the order of 25 g/m$^2$ may have barrier properties equivalent to those of a fluorinated substrate of 70 g/m$^2$ of the prior art.

Regarding grease resistance at folds, it may be improved by adding a paper wet strength agent, an anionic agent, or a sizing agent, and/or optionally by a double layer comprising fibers from resinous pines and nanofibrillar polysaccharide.

According to a specific embodiment, the fibrous substrate identified in the invention is biodegradable. In other words, this is a "substance that may, under the action of living organisms, decompose into various elements devoid of harmful effects on the environment".

The substrate according to the invention may be foldable, in particular by steam. It may be printable and present a suitable surface for sealing operations. Indeed, the optional presence of a layer comprising a thermofusible polymer such as PLA may give it self-sealing properties.

The present invention may in particular find application in the manufacture of paper or cardboard to make packaging materials, in particular for pet agrifood. It may also be applied to storing other fatty substances such as butter.

The fibrous substrate identified in the invention may have grease, water vapor, oxygen or solvents barrier properties. This fibrous substrate of the invention may also be used in the field of specialty papers that require a certain barrier level to solvents or other organic compounds. To illustrate the case of organic compounds, we can mention papers that are coated with silicone to get release properties needed as for example in release papers for self-adhesive labels. Generally speaking no more than 1 g/m$^2$ of silicone is coated at the surface of paper thus it is important that the silicone doesn't penetrate in the substrate but stays at its surface. This barrier to silicone also named silicone hold out is measured with castor oil cobb absorption (ISO 535)—At this test, the result of oil absorption is about 1.1 g/m² for a paper (40-60 gsm) intended to be siliconised When the fibrous substrate comprises at least one additional layer, this layer can give enough mechanical strength to form, for example, trays.

The optional biodegradable properties of the fibrous substrate identified in the invention and the nature of its constituents allow the proposal of optionally biosourced alternatives to commonly used plastics and to fluorinated papers.

The work on paper sizing published in 1989 by Tappi (Technical Association of the Pulp and Paper Industry) gives information on a series of tests to quickly check the grease barrier of fluorinated products. Certain of these tests use organic solvents such as turpentine and mixtures of variable levels of heptane, toluene, castor oil that may range up to pure heptane.

Since the single-layer fibrous substrate of the invention has a kit test No. 12 (100% heptane) for a time greatly exceeding the time of 15 s as stipulated in T559 pm-96 and exceeding the time of 1800 s as stipulated in T454 om-94, and therefore has a solvent-barrier level greatly exceeding the time between applying a solvent varnish for pre-metallization and its drying, it became necessary to check whether this type of substrate could after varnishing and metallization offer the metallization yield obtained after calendering of a layer of clay coating applied to a paper, the layer of clay coating and the calendering thereby maintaining the varnish on the surface of the paper.

Further, the single- or multi-layered fibrous substrate of the invention may also be used in the field of metallized papers. The fibrous substrate identified in the invention may thereby present a metallic visual appearance, such as that of aluminum after having been varnished and metallized without having been necessarily coated with a layer containing a binder and clay and without necessarily having been calendered. Further, as already stated, it may have an ash content lower than 0.22% compared to its weight.

By contrast, to give a metallic appearance and opacity properties to papers of the prior art, the latter are generally covered with a clay-based layer, then calendered before being treated with a varnish. The ash content of these substrates in the prior art is generally of the order of at least 15% given the presence of clay.

Accordingly, a fibrous substrate according to the invention at 25 g/m² may have higher opacity after varnishing and metallization than that of a plastic film at 75 g/m².

In view of the above discussed metallization it should be understood that the fibrous substrate of the invention, and in particular the monolayer substrate, has an ash content of less than 10% by weight, compared with the weight of said fibrous substrate, even more advantageously of less than 5%.

This substrate may thus be used in packaging of fatty substances such as butter.

It may also be used for applications requiring high barrier properties, in the medical field, for example.

Manufacturing Process:

The present invention also relates to a manufacturing process of the single-layer fibrous substrate described hereinbefore, according to the following steps:
depositing, on a continuously moving forming wire of a paper machine a suspension comprising, by weight compared with the dry weight of the suspension:
between 39.9 and 87.9% natural fibers refined to above 50° SR;
between 12 and 60% nanofibrillar polysaccharide; and
between 0.1 and 4% of at least one retention agent; to form a layer,
dewatering the resulting layer to form a wet sheet;
optionally, pressing the sheet; and
drying the wet sheet.

According to a specific embodiment, the preparation process for the fibrous substrate identified in the invention may further comprise the formation of additional layers according to the techniques that are known to the person skilled in the art. Accordingly, a multi-layer fibrous substrate may be obtained by successive formation of several layers. The composition of these layers may be of the same nature or not compared with the composition of the fibrous substrate identified in the invention.

All additional layers may be made sequentially or simultaneously by using one or more head boxes on a continuously moving porous forming wire.

According to a specific embodiment, when the fibrous substrate comprises at least one additional layer, the process comprises the following steps:
depositing, on a continuously moving forming wire of a paper machine, a suspension comprising, by weight compared with the dry weight of the suspension:
between 39.9 and 87.9% natural fibers refined to above 50° SR;
between 12 and 60% nanofibrillar polysaccharide; and
between 0.1 and 4% of at least one retention agent, to form a layer,
dewatering the resulting layer to form a first wet sheet;
applying onto the first wet sheet a second wet sheet obtained after dewatering a second suspension applied on a second continuously moving forming wire and comprising a similar or different composition compared to that used for manufacturing the first wet sheet;
applying, optionally, onto the first and second wet sheets a third wet sheet comprising a similar or different composition compared to those used for manufacturing the first and the second sheets;
pressing the wet sheets together for forming a multi-layer substrate; and
treating the resulting multi-layer substrate by drying.

According to another specific embodiment relating to manufacturing a multi-layer substrate, another alternative consists in using a paper machine equipped with a headbox with several compartments. The process may thus comprise the following steps:
depositing simultaneously at least two layers on an inclined continuously moving forming wire of a paper machine equipped with a headbox with several compartments, so as to form a sheet, at least one of these layers being composed of a suspension comprising, by weight compared with the dry weight of the suspension:
between 39.9 and 87.9% natural fibers refined to above 50° SR;
between 12 and 60% nanofibrillar polysaccharide; and
between 0.1 and 4% of at least on retention agent,
dewatering, optionally, the resulting sheet, advantageously by pressing; and
drying the sheet.

The presence of at least one retention agent in the suspension of natural fibers and nanofibrils leads to flock formation. Consequently, generally, before entering into the headbox and therefore before being deposited on the forming wire, the solution or suspension of fibers may be stirred until the flocks are broken. The resulting layer after the concentration step is relatively homogeneous and devoid of flocks. The composition of the fibrous substrate identified in the invention is therefore advantageously distributed homogeneously.

The techniques used to make the fibrous substrate of the invention are part of the general knowledge of the person skilled in the art. It may thus be made on conventional paper machines. Consequently, according to the material used, it may be obtained wet or totally dry.

The fibrous substrate, comprising additional layers or not, is generally formed and removed from the forming wire when it is sufficiently dry or totally dry. It can be removed by direct contact or indirect contact between the fibrous substrate and a hot non-adhesive surface such as a fluorinated substrate, for example Teflon. The temperature of the substrate is adjusted depending on the production rate in particular, according to the knowledge of the person skilled in the art.

Once formed, the fibrous substrate of the invention may be pressed and/or calendered. However, bearing in mind the properties of the substrate and in particular its thickness/basis weight ratio, the Applicant considers, without wishing to be bound by any particular theory, that it is possible that the presence of nanofibrils contributes to making the substrate more dense, which could make the pressing and/or calendering steps optional.

The calendering treatment may nevertheless increase the density of the fibrous substrate and the cohesive effect, in particular by introducing additives having glass transition temperatures lower than those of the natural fibers and/or the polysaccharide (230° C.).

Further, the fibrous substrate may be subjected to a heat treatment in particular when it comprises at least one thermoplastic additive or at least one additional layer comprising a thermoplastic.

The fibrous substrate may also be subjected to surface treatments such as size press, film press, coating with or without contact with the coater (spray, curtain, etc.). These treatments may give a substrate its final folding, printability, or heat-sealing functionalities via coating compounds (deposits greater than 2 g/m$^2$).

Calendering may improve the lipophobic properties of the substrate and/or its metallic appearance.

The invention and the benefits it gives will be clearer upon reading the following examples, given to illustrate the invention and not to limit it in any way.

Examples of Embodiments of the Invention

Several fibrous substrates were prepared on a Model 22 dynamic sheet-former patented by the Technical Center for the Cardboard, Paper and Cellulose Industry.

The dynamic sheet former is a laboratory equipment designed to produce a fibrous material using the wet laid technology not limited to the web forming techniques described in the Papermaking Science & Technology publication (Chap 6 Web Forming Papermaking Part 1, Stock Preparation and Wet End). The laboratory sheet is obtained by projecting a fibrous suspension through a nozzle onto a vertical rotating wire preliminary covered by a thin film of water. The projection is made so to end up with a defect free fibrous material showing same physical characteristics in any particular area. During sheet formation, the sheet is continuously dewatered due to the centrifugal force and the possibility for the water to escape progressively. When the formation is completed, a mobile bale located underneath the vertical rotating wire is progressively introduced into the vertical water volume trapped in between the perforated frame holding the wire and the surface of the cylinder encapsulating the pre cited equipment. The removal of such a water volume is creating a vacuum effect allowing to remove most of the residual water contained in the few millimeters thick wet fibrous layer. At the end of the projection and drainage, the sheet obtained undergoes the necessary for drying.

In the present case, the cellulose suspension has a concentration of 5 g/L comprising the appropriate quantities of cellulose fibers, NFC and at least a retention agent. The formation wire has a textest air permeability of approximately 950 l/m$^2$/hr and plated on the perforated cylinder rotating at 900 rpm.

Regarding the substrates according to the invention, it should be noted that because of the presence of the retention agent, the turbidity level of the water obtained during the dewatering process does not generally exceed 5 FAU units (Formazin Attenuation Unit specified by ISO 7027 for water treatment standards for turbidity measurements at 0°). In other words, the nanofibrils present in the cellulose suspension are not passing through the forming wire when the fibrous substrate is formed as retained in the fibrous substrate of the invention.

For more clarity, the quantity of fibers and NFC in the substrates described hereinafter is expressed compared to the total quantity of fibers and NFC. Accordingly, the substrate according to example 4 (50% fibers+50% NFC) comprises a 50/50 ratio of fibers/NFC and 0.12% retention agent.

Examples 1, 2, 3: Fibrous Substrates Containing 100% Natural Fibers

The fiber from resinous Arauco 90 Radiata Pine was disintegrated according to ISO standard 5263-1995E then refined with a PFI refiner according to ISO standard 5294-2 to reach a dewatering index of 90° Schopper-Riegler after 11,000 rotations in the PFI refiner.

The concentration was brought to 5 g/L to make examples 1-3 with the dynamic sheet-former.

The sheets were dried in contact with a sheet of Teflon maintained at a temperature of 105° C. A dryer felt holds the sheet in contact with the Teflon.

A resistance test for fats as described hereinafter was conducted for 15 hours.

The grease-barrier level obtained is poor because the percentage of stained surface area greatly exceeds the minimum threshold of 5%, regardless of the side of the sample tested, the wire side or the felt side.

Indication T: The grease-barrier property tests are conducted on the side of the substrate in contact with the Teflon substrate.

Indication W: The grease-barrier property tests are conducted on the side of the substrate not in contact with the Teflon substrate.

Examples 4, 5, 6: Fibrous Substrates Containing Natural Fibers and NFC (50/50 by Weight)

These substrates were made in accordance with the substrates in examples 1-3 regarding the preparation of the resinous fiber at 5 g/L previously refined to 90° SR.

However, 50% NFC was added.

Thus, 50% of refined fibers at SR °90 at a consistency of 5 g/L was mixed with 50% NFC at a consistency of 5 g/L and the whole was homogenized at 30,000 rpm according to ISO5263-1995E.

A retention agent such as Nalco 74524 was added at 0.12% compared with the total dry weight of fibers and NFC, and the stirring time with the Nalco 74524 was 5 minutes before being added in the pulp chest of the dynamic sheet-former.

The sheets were dried in the same manner as for examples 1-3.

liters Flexize ED3025 as is (dry substance 25%) per dry ton of refined fibers+NFC mixture, then 8 liters of aluminum sulfate as it is (dry substance 8%) per dry ton of refined fibers+NFC mixture.

The grease-barrier level is slightly improved in the sense that the barrier difference became insignificant between sides T and W.

TABLE 1

Grease resistance for fibrous substrates in the prior art (examples 1-3) and according to the invention (examples 4-8)

| Example | g/m² | Arauco radiata pine 90° SR | Unbleached Aspa UKP-E 90° SR fiber | NFC | Additives (Kymene, Hercobond, flexize, aluminum sulfate) | Surface exposed to grease | Resistance to grease % stains |
|---|---|---|---|---|---|---|---|
| 1 | 22 | 100% | | | | T | 50.6 |
| | | | | | | W | 70.1 |
| 2 | 41.8 | 100% | | | | T | 33.4 |
| | | | | | | W | 66.2 |
| 3 | 41.4 | 100% | | | | T | 29.6 |
| | | | | | | W | 77.7 |
| 4 | 25 | 50% | | 50% | | T | 0.32 |
| | | | | | | W | 1.91 |
| 5 | 36 | 50% | | 50% | | T | 0.15 |
| | | | | | | W | 0.96 |
| 6 | 75 | 50% | | 50% | | T | 0.38 |
| | | | | | | W | 2.55 |
| 7 | 65.6 | | 50% | 50% | | T | 0.32 |
| | | | | | | W | 0.64 |
| 8 | 60.6 | 50% | | 50% | YES | T | 0.23 |
| | | | | | | W | 0.32 |
| paper treated with fluorine | 70 | | | | | | 0.52 |

The side assessed to test grease resistance is the one used for examples 1-3.

The grease-barrier level obtained with samples 4-6 is satisfactory because the percentage of stained surface area is low. It is comparable to that obtained by a fluorinated substrate (see table 1).

Example 7: Bilayer Fibrous Substrate Containing Natural Fibers and NFC (50/50 by Weight)

This was prepared as for examples 4-6 apart from the bleached resinous fiber being replaced by ASPA UKP-E unbleached fiber or similar.

Example 7 is also different from examples 4-6 in that it includes two identical layers, the second one having been produced after the first one by projecting a second suspension onto that applied first onto the forming wire.

The grease-barrier level obtained from an unbleached refined fiber/NFC mixture is comparable to that obtained with the bleached refined fiber/NFC mixture.

Example 8: Fibrous Substrate Containing Natural Fibers and NFC (50/50 by Weight)

This was prepared as for examples 4-6 apart from after having homogenized the 50% fibers refined to SR °90+50% NFC mixture at 30,000 rotations according to ISO5263-1995$^E$, additives were added to improve the folding resistance. We first added 14 kg dry Kymene 617 per dry ton of refined fibers+NFC mixture, then 3.8 kg dry Hercobond 2050P per dry ton of refined fibers+NFC mixture then 17

Examples 9, 10, 11: Fibrous Substrates without NFC

The resinous fiber Arauco 90 Radiata Pine was disintegrated according to ISO 5263-1995E then refined with a PFI refiner according to ISO 5294-2 to reach three levels of refining i.e. 50° Schopper Riegler (example 9), 70° SR (example 10), 90° SR (example 11) to assess the effect of these refining levels without adding NFC. To make these sheets, the concentrations were brought to 5 g/L. The sheets were dried in contact with a Teflon sheet maintained at 105° C. to reach moisture below 4%. The grease barrier was assessed for 70 hours according to the specified test. The results obtained indicate that refining fibers, alone, does not improve grease resistance.

Examples 12-24: Fibrous Substrates Comprising NFC

To determine the percentage of NFC to add as a function of refining, and to compare these examples with examples 9-11 without NFC, different levels of NFC were added to fibers refined to 50° SR, 70° SR and 90° SR.

The preparation protocol is identical to that used for examples 4-6 apart from the additives listed to make example 8 being used to optimize the fold resistance. Moreover, retention agent Nalco 79524 was replaced with 0.2% dry Percol 1830 compared with the dry weight of fibers and NFC contained in each preparation.

TABLE 2

Grease resistance for fibrous substrates in the prior art (examples 9-11) and according to the invention (examples 12-24)

| Example | Composition (% NFC + resinous - ° SR) | Basis weight to thickness ratio | Grease resistance % surface stained | Density g/cm³ | Permeability PPS mL/min |
|---|---|---|---|---|---|
| 9 | 0% NFC + 100% resinous 50° SR | 2.177 | 183 | 0.459 | 2467 |
| 10 | 0% NFC + 100% resinous 70° SR | 1.94 | 183 | 0.515 | 587 |
| 11 | 0% NFC + 100% resinous 90° SR | 1.405 | 150 | 0.711 | 0.53 |
| 12 | 25% NFC + 75% resinous 50° SR | 1.526 | 183 | 0.655 | 0.78 |
| 13 | 25% NFC + 75% resinous 70° SR | 1.481 | 156.7 | 0.675 | 0.7 |
| 14 | 25% NFC + 75% resinous 90° SR | 1.185 | 0.95 | 0.843 | 0.47 |
| 15 | 37.5% NFC + 62.5% resinous 50° SR | 1.293 | 4.9 | 0.773 | 0.58 |
| 16 | 37.5% NFC + 62.5% resinous 70° SR | 1.298 | 2.5 | 0.77 | 0.61 |
| 17 | 37.5% NFC + 62.5% resinous 90° SR | 1.115 | 0.7 | 0.896 | 0.51 |
| 18 | 50% NFC + 50% resinous 50° SR | 1.131 | 0.78 | 0.883 | 0.52 |
| 19 | 50% NFC + 50% resinous 70° SR | 1.161 | 0.75 | 0.861 | 0.47 |
| 20 | 50% NFC + 50% resinous 90° SR | 1.116 | 0.79 | 0.895 | 0.5 |
| 21 | 12.5% NFC + 87.5% resinous 90° SR | 1.263 | 34.39 | 0.791 | 0.57 |
| 22 | 18.5% NFC + 81.5% resinous 90° SR | 1.265 | 5.15 | 0.789 | 0.64 |
| 23 | 22% NFC + 88% resinous 90° SR | 1.218 | 2.86 | 0.82 | 0.55 |
| 24 | 25% NFC + 75% resinous 90° SR | 1.209 | 1.91 | 0.826 | 0.5 |

The grease barrier level of the substrate according to example 20 of the invention has moreover been tested according to the standard ASTM F119-82 referenced in patent WO 2011/056130. The Stora sample (containing less than or equal to 20% MFC of lengths between 100 nm-200 µm on the surface) was folded with a weight twice as low as that specified and its grease barrier level is limited to 32-48 hours whereas sample 20 folded with the weight described in F119-82 offers a grease barrier that exceeds 15 days.

Previously, the chicken fat evaporation level had been checked to identify whether any chicken fat had to be added over time.

Moreover, the water-vapor barrier in non-calendered example 20 is from 97-112 g/m²/24 hours at 23° C. 50% RH and it is 190 g/m²/24 hours in the MFC example in WO 2011/056130.

MFC are macrofibrils whose diameter may vary from 20 nanometers to 10 micrometers, with a few original fibers 20 micrometers in diameter. The length of the MFC may reach 200 micrometers.

Example 25: Fibrous Substrate Comprising NFC

This was made to check the effect of wet pressing and calendering on the grease barrier. The sample was made like the examples in table 2 from example 14 apart from the sheet being dried on a steel plate heated to 105° C. The grease resistance was assessed according to the method given in table 2, i.e. for 70 hours.

TABLE 3

Effects of wet pressing and calendering the fibrous substrate on grease-resistance properties

| Example | % resinous fibers | resinous fibers refining ° SR | % NFC | Wet pressing | Drying surface | Calendering | Grease resistance % surface stained | Thickness/ basis weight ratio | Density g/cm³ |
|---|---|---|---|---|---|---|---|---|---|
| 25 | 75 | 90 | 25 | 2 passes 3 bar | Steel 105° C. | NO | 0.79 | 1.21 | 0.818 |
| | | | | | Steel 105° C. | 12 passages 230 KN 95° C. 10 m/min | 0.06 | 0.78 | 1.271 |
| 14 | 75 | 90 | 25 | NO | Teflon 105° C. | NO | 0.95 | 1.185 | 0.843 |

Examples 26, 27, 28: Multi-Layer Fibrous Substrates Comprising NFC

Some multi-layer substrates were made. In example 26, the barrier layer example 20 or similar containing 50% NFC and 50% fibers refined to 90° SR was applied at 60 g/m² on a layer of 20 g/m² Arauco 90 fibers refined to 90° Schopper-Riegler itself applied to a fibrous layer having Textest porosity 520 L/m²/sec. In example 27, the barrier layer is constituted of 30 g NFC and additives Kymene 617, Hercobond 2050P, Flexize ED3025, Al₂(SO₄)₃ and Percol 1830 at the levels described in example 8. In this case, they were added compared with the dry weight of NFC.

Example 28 is identical to example 27 apart from the weight of NFC being doubled. The grease resistance was assessed according to the method shown in table 1, i.e. for 70 hours.

Example 26 demonstrates in particular that the grease-barrier level is better when a same quantity of NFC is comprised in the highly refined fibers.

TABLE 4

Effect of the presence of highly refined fibers on the grease resistance of substrates

| Example | 3rd layer g/m² | Composition | Grease resistance % surface stained |
|---|---|---|---|
| 26 | 60 | 50% NFC + 50% fibers refined to 90° SR | 30 |
| 27 | 30 | 100% NFC | 160 |
| 28 | 60 | 100% NFC | 60 |

Example 29: Multi-Layer Fibrous Substrates Comprising NFC

A multi-layer was made with example 20 onto which a layer strengthening the mechanical tear characteristics was added. The grease resistance was assessed according to the method shown in table 2, i.e. for 70 hours.

TABLE 5

Grease resistance of a single-layer fibrous substrate compared with a multi-layer fibrous substrate

| | | Tear mN | | |
|---|---|---|---|---|
| Example | g/m² | Cross direction | Machine direction | Grease resistance % surface stained |
| 20 | 68 | 266 | 231 | 0.77 |
| 29 | 148 | 3519 | 3486 | 0.18 |

Example 30: Multi-Layer Fibrous Substrates Comprising NFC

Before the successive deposits indicated in example 29, a deposit of 20 g fibers refined to 90° SR was applied. The barrier level of sample 30 remains unchanged compared with example 29 when it was dried compressed at 0.4 kg/cm² pressure between felts and steel taken to 180° C.

Examples 31, 32, 33: Fibrous Substrate Comprising a Coating

Example 32, substrate of the invention, was coated with pre-metallization varnish [and] compared to a sulfurized parchment paper (example 31) and a coated calendered paper for metallization (example 33).

Substrate 32 produces a good metallic yield without needing a coating of a pigment layer and the calendering operation. The substrate identified in the invention meets the needs of applications that require the properties of metallic appearance, low filler content (<10%), grease resistance and opacity (≥75%), which substrates 31 and 33 cannot guarantee.

The test method to check the grease-barrier properties was published in an article that appeared in Packaging Technology and Science 2002; 15:65-74 "Novel method for testing the grease resistance of pet agrifood packaging". Before the test, the 12 by 12 cm² sample to be tested is folded in the machine direction then in the cross direction to form a cross passing through the center. Each fold is marked using back and forth passage of a 10 kg Cobb roll. The test consists in depositing the folded sample on a steel square with the side to be tested on the outside. A ring having an inner diameter of 10 cm and being 5 cm high is placed in the center of the sample. 60 g dog kibble is poured into the ring. A 2 kg weight is put on the kibble. The experiment is exposed to a climatic chamber set at 60° C. and 65% relative humidity for 70 hours. At the end of the test, the sample is placed on a light table to assess the percentage surface area stained. 100% indicates that the surface of 78.5 cm² contained inside the ring is entirely stained, 183% indicates that the stained surface corresponds to the surface of the sample, i.e. 144 cm².

TABLE 6

Effects of a coating on a fibrous substrate

| | Example | | |
|---|---|---|---|
| | 31 | 32 | 33 |
| substrate type | Parchment paper | Invention substrate | Coated calendered paper for metallization |
| g/m² | 53 | 30 | 70 |
| Main fibrous composition | Refined hardwood under 50° SR | 50% resinous fibers refined to 90° SR + 50% NFC + additives example No. 149 | Mixture resinous deciduous refined under 50° SR |
| surface coating g/m² dry | no | no | 14 s |
| calendering | no | no | yes |
| PPS roughness μm | 8.31 | 6.56 | 1.35 |
| Grease resistance % surface stained after 70 hours (60° C. 65% RH) | 66 | 0.7 | 183 |
| % staining in packaged butter after 9 months | | 0 | |
| DIN 53146 Opacity before metallization | 35 | 31 | 81 |
| Din Opacity after metallization | 80 | 81 | 90 |
| Ash content 900° C. | 0 | 0.24 | 19.8 |
| Gloss 60° after coating of 1.5 g pre-metallization solvent varnish (%) | 7.3 | 12.9 | 59 |
| Gloss 60° after extra coating of 1.5 g aqueous pre-metallization solvent varnish (%) | 11.6 | 22 | |
| Metallic gloss 60° after aqueous pre-metallization varnish coating (%) | | | 467 |
| Metallic gloss 60° after aqueous pre-metallization varnish coating (%) | 99 | 212 | |
| Metallic appearance | Insufficient | Acceptable | Excellent |

The research that produced these results was financed by the European Union via the Seventh Framework Program for Technological Research and Development (2007-2013).

The invention claimed is:
1. A fibrous substrate comprising, by dry weight compared to the weight of the substrate, a) between 39.9 and 87.9% natural fibers refined to between 50 and 95° SR;
b) between 12 and 60% nanofibrillar polysaccharide having a diameter or thickness between 5 and 100 nanometers, and a length less than 1 micrometer;
c) between 0.1 and 4% of at least one retention agent; and
d) less than 10% ash content; wherein
a ratio between a thickness of the substrate, expressed in micrometers, and a weight per unit of surface area of the substrate, expressed in grams per square meter, is less than 1.4 $\mu m/(g/m^2)$.

2. The fibrous substrate according to claim 1, wherein the fibrous substrate has a weight of at least 10 $g/m^2$.

3. The fibrous substrate according to claim 1, wherein the natural fibers are cellulose fibers and wherein the nanofibrillar polysaccharide is nanofibrillar cellulose.

4. The fibrous substrate according to claim 1, further comprising at least one additive chosen from the group comprising paper wet strength agents, sizing agents, and inorganic salts.

5. The fibrous substrate according to claim 1, wherein the substrate is a single-layer fibrous substrate.

6. The fibrous substrate according to claim 1, wherein the substrate comprises a layer in a multilayer fibrous substrate.

7. The fibrous substrate according to claim 1, wherein the substrate comprises a fatty-substance barrier.

8. The fibrous substrate according to claim 1, wherein the substrate comprises a release paper.

9. The fibrous substrate according to claim 1, wherein the substrate comprises a substrate for metallization.

10. The fibrous substrate according to claim 1, wherein the substrate comprises a substrate for packaging.

11. The fibrous substrate according to claim 6, wherein the multilayer fibrous substrate includes at least one mechanical strengthening layer.

12. The fibrous substrate according to claim 10, wherein the substrate for packaging comprises a substrate for agrifood packaging.

13. The fibrous substrate according to claim 12, wherein the substrate for agrifood packaging comprises a substrate for pet agrifood packaging.

14. The fibrous substrate according to claim 10, wherein the substrate for packaging comprises a substrate for fatty substance packaging.

15. The fibrous substrate according to claim 14, wherein the substrate for fatty substance packaging comprises a substrate for butter packaging.

16. The fibrous substrate according to claim 1, wherein the substrate comprises less than 5% ash content.

17. The fibrous substrate according to claim 1, wherein the substrate comprises a substrate having an improved grease-barrier level compared to a substrate without nanofibrillar polysaccharide.

18. The fibrous substrate according to claim 1, wherein the substrate comprises a substrate having a grease-barrier level of less than a threshold of 5% of stained surface.

19. The fibrous substrate according to claim 1, wherein the ratio between the thickness of the substrate, expressed in micrometers, and the weight per unit of surface area of the substrate, expressed in grams per square meter, is less than 1.14 $\mu m/(g/m^2)$.

* * * * *